July 3, 1934.  M. ROMAINE ET AL  1,965,259
MILLING MACHINE
Filed Jan. 28, 1932   6 Sheets-Sheet 1

Inventor
MILLARD ROMAINE
WALTER D. ARCHEA
By H. K. Parsons
Attorney

July 3, 1934.  M. ROMAINE ET AL  1,965,259
MILLING MACHINE
Filed Jan. 28, 1932   6 Sheets-Sheet 2

Inventor
MILLARD ROMAINE
WALTER D. ARCHEA
By AHK Parsons
Attorney

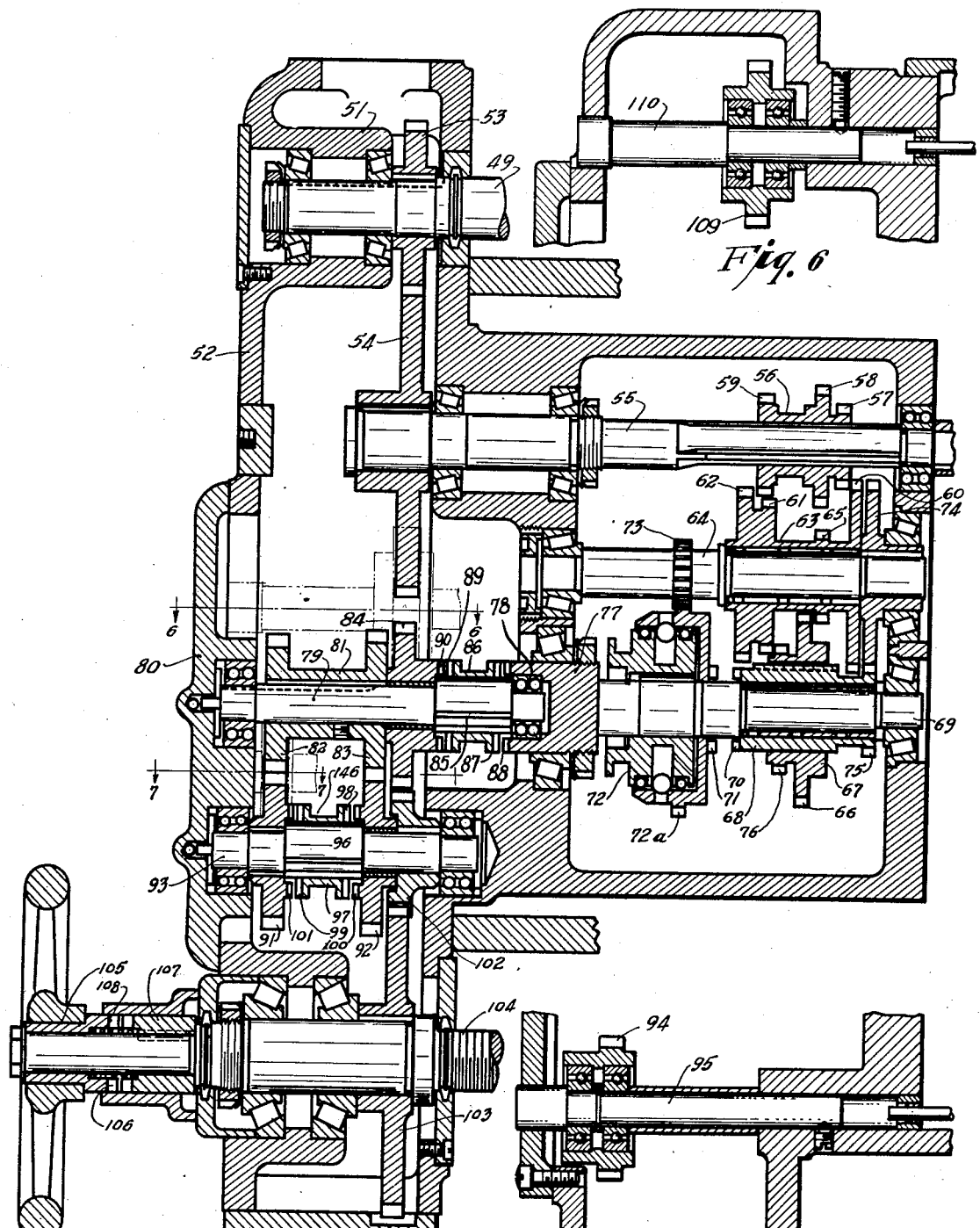

July 3, 1934.    M. ROMAINE ET AL    1,965,259
MILLING MACHINE
Filed Jan. 28, 1932    6 Sheets-Sheet 4
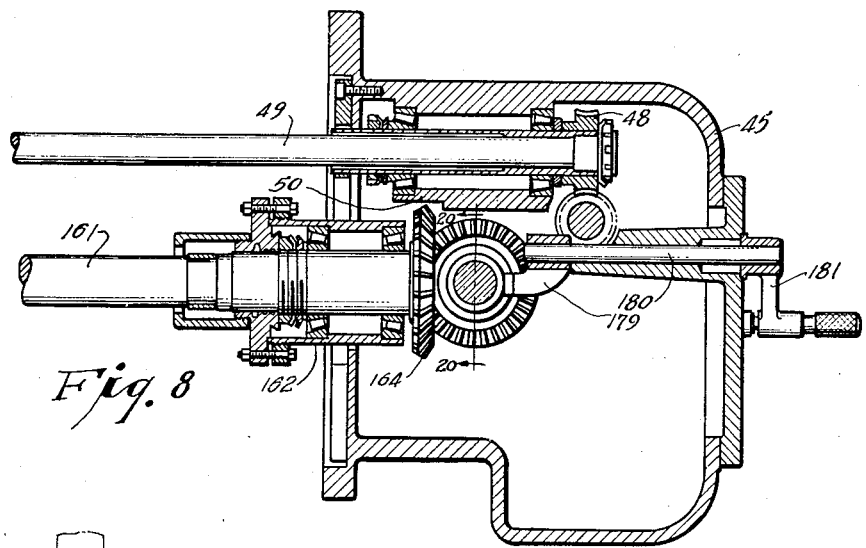
Fig. 8
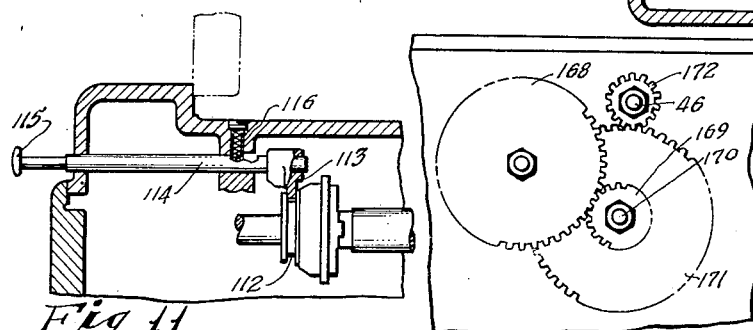
Fig. 11    Fig. 9
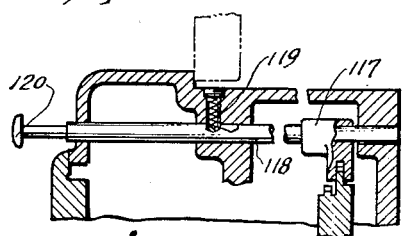
Fig. 12
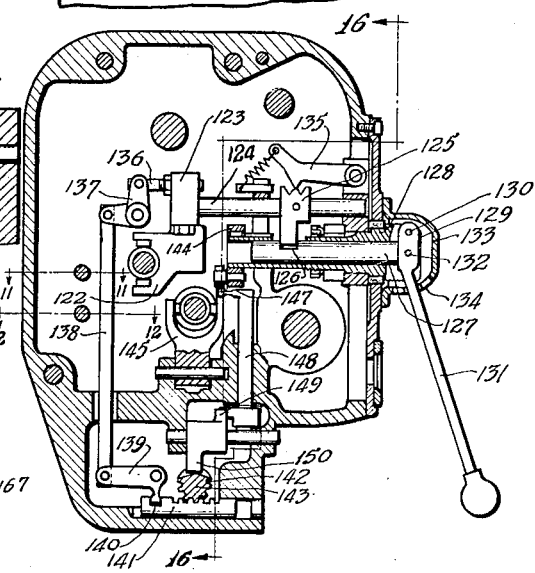
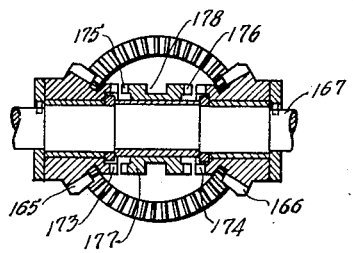
Fig. 20    Fig. 10
Inventor
MILLARD ROMAINE
WALTER D. ARCHEA
By  A. H. K. Parsons
Attorney

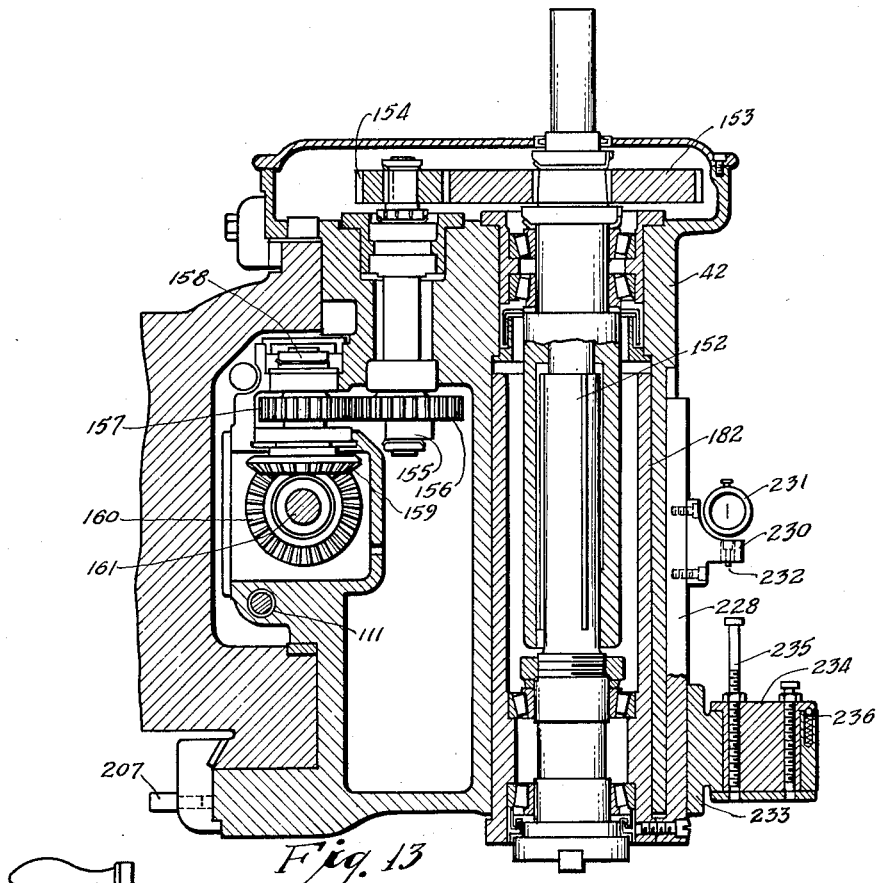
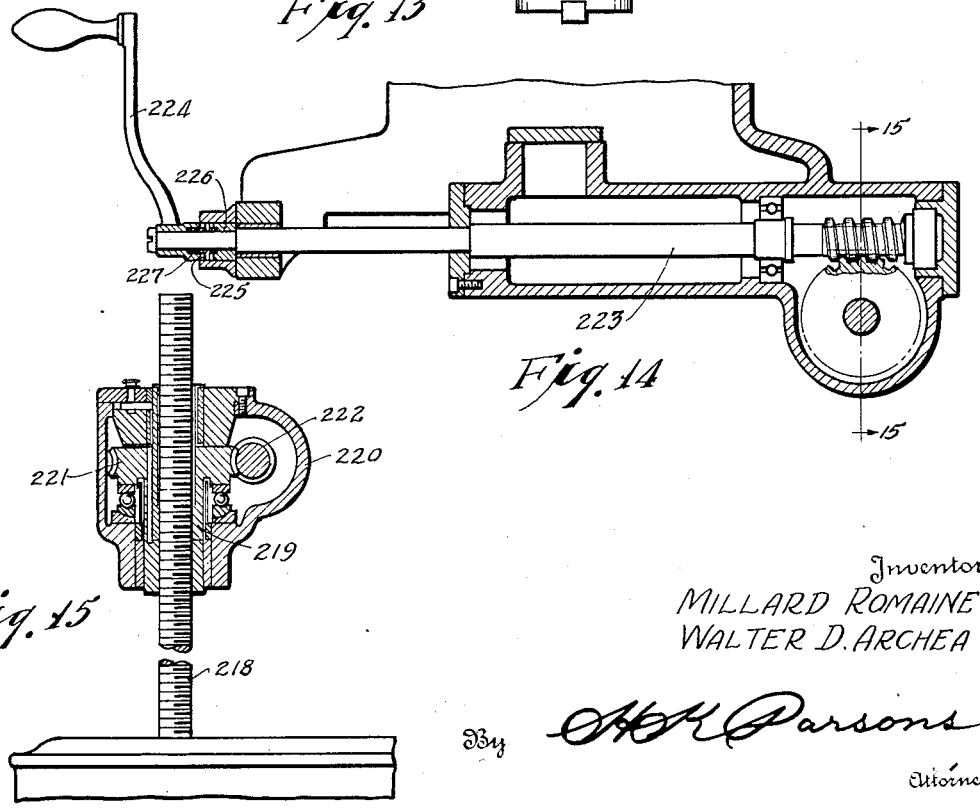

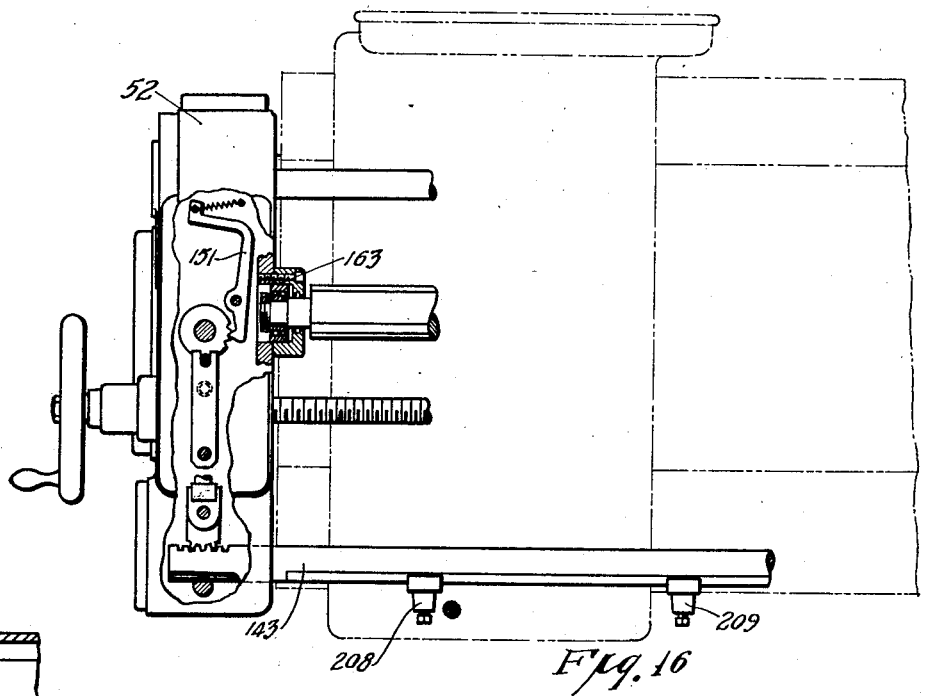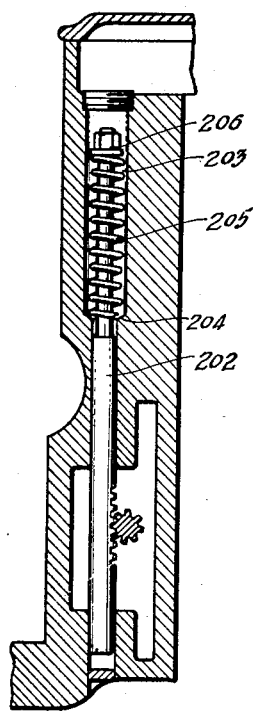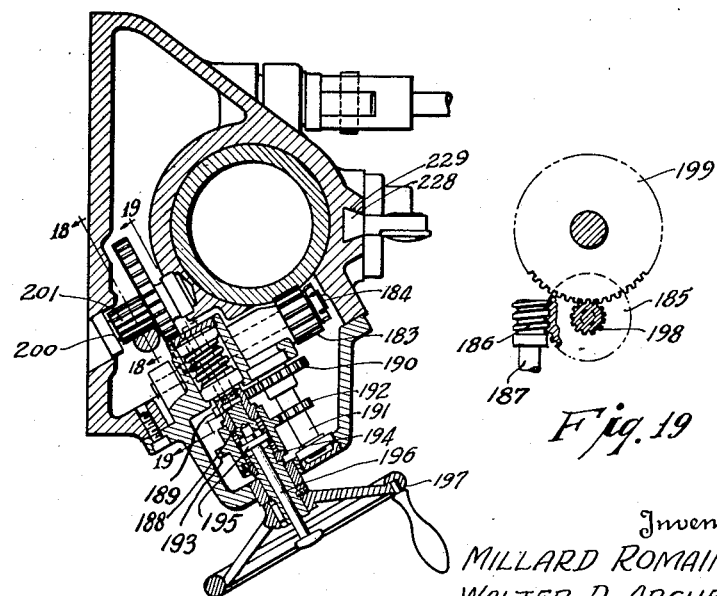

Patented July 3, 1934

1,965,259

UNITED STATES PATENT OFFICE 1,965,259

MILLING MACHINE

Millard Romaine and Walter D. Archea, Cincinnati, Ohio, assignors to The Cincinnati Milling Machine Company, Cincinnati, Ohio, a corporation of Ohio Application January 28, 1932, Serial No. 589,456

11 Claims. (Cl. 90—16)

This invention relates to improvements in machine tools and especially to improvements in milling machines.

An object of the invention is the provision of a milling machine having a vertically and horizontally shifted tool for performing vertical and horizontal milling operations.

Another object of the invention is the provision of a machine tool of the nature described in which the drive to the tool is materially simplified and in which the control is at all times within convenient reach of the operator.

A further object of the invention is the provision of a rail type milling machine so constructed and arranged as to simplify the control and operation of the several parts of the tool.

Additional objects of the invention consist in improved details of construction of the operating parts, simplicity of gauging the various positions of the parts, and directional indication of the movements of the several parts.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Figure 5 is a development of the feed gearing mounted on the end of the rail.

Figure 6 is a sectional view taken at line 6—6 of Figure 5.

Figure 7 is a sectional view taken at line 7—7 of Figure 5.

Figure 8 is a sectional view taken on line 8—8 of Figure 3.

Figure 9 is a sectional view taken on line 9—9 of Figure 3.

Figure 10 is a sectional view taken on line 10—10 of Figure 2.

Figure 11 is a sectional view taken on line 11—11 of Figure 10.

Figure 12 is a sectional view taken on line 12—12 of Figure 10.

Figure 13 is a sectional view taken on line 13—13 of Figure 2.

Figure 14 is a sectional view taken substantially on line 14—14 of Figure 1.

Figure 15 is a fragmentary sectional view taken on line 15—15 of Figure 14.

Figure 16 is a view partly in section and partly in elevation as seen substantially from line 16—16 of Figure 10.

Figure 17 is a sectional view taken on line 17—17 of Figure 2.

Figure 18 is a sectional view taken on line 18—18 of Figure 17.

Figure 19 is a sectional view taken on line 19—19 of Figure 17.

Figure 20 is a sectional view taken on line 20—20 of Figure 8.

Throughout the several views of the drawings similar reference characters are employed to denote the same or similar parts.

Figures 1, 21:
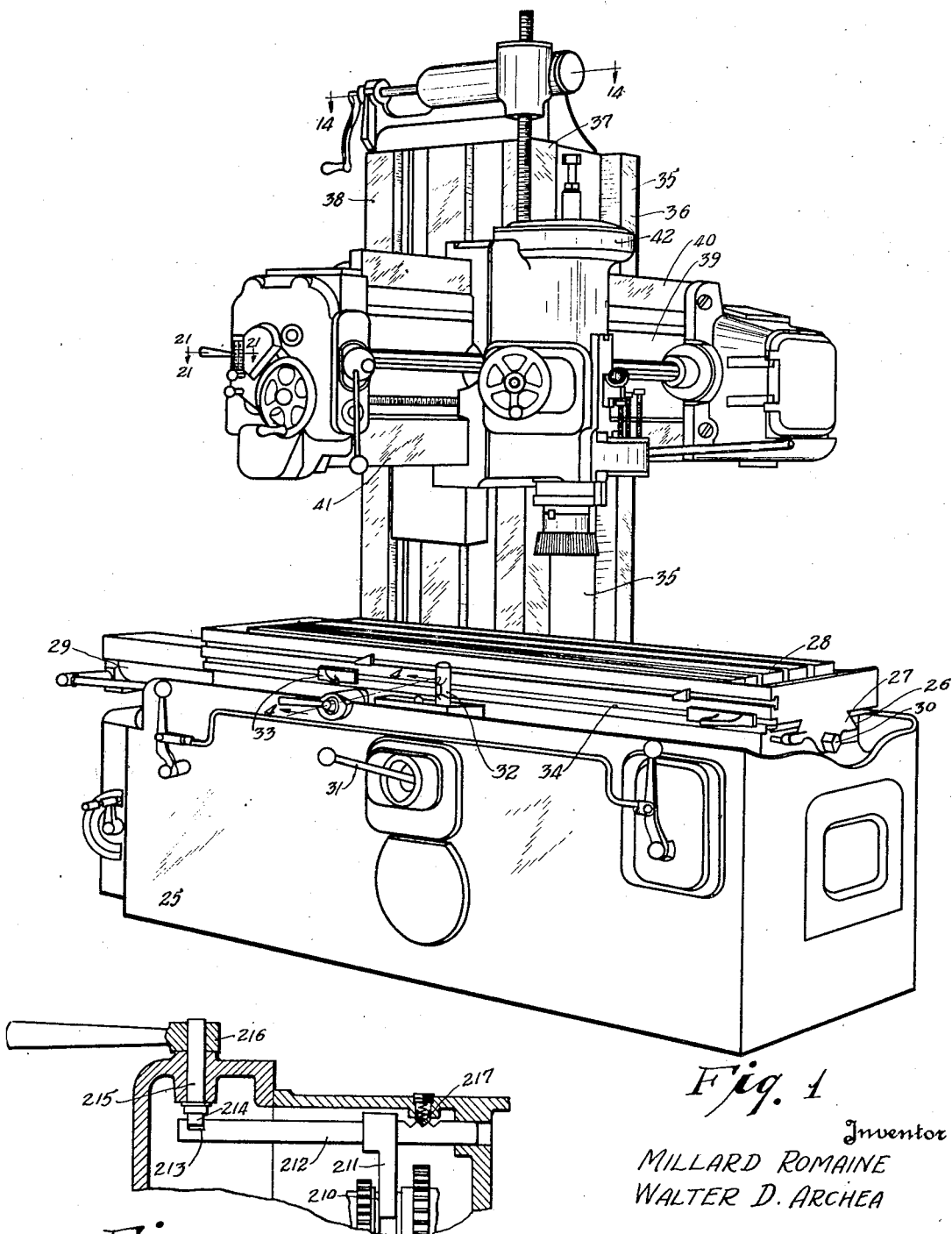
Figure 1 is a perspective view of a milling machine embodying the improvements of this invention.
Figure 21 is a sectional view taken on line 21—21 of Figure 1.
Figure 3:
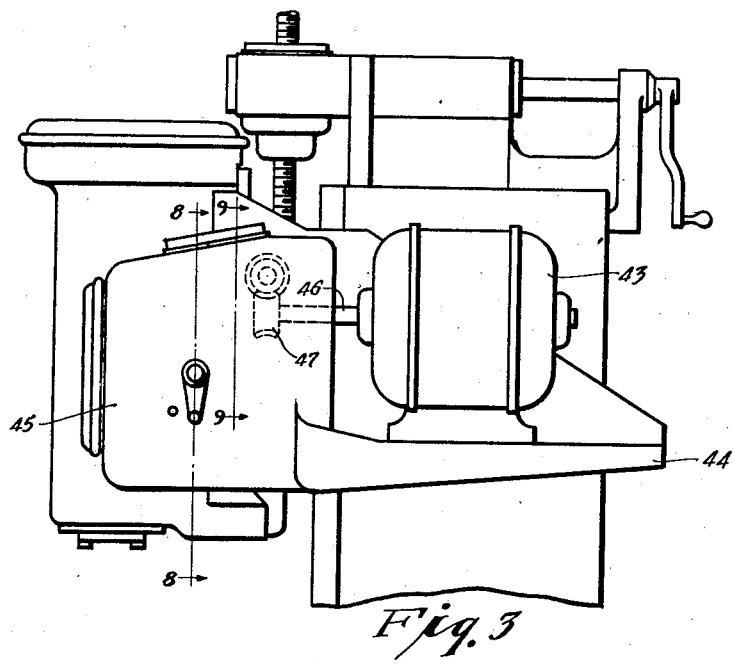
Figure 3 is an end elevation of the parts shown in Figure 2.
Figure 2:
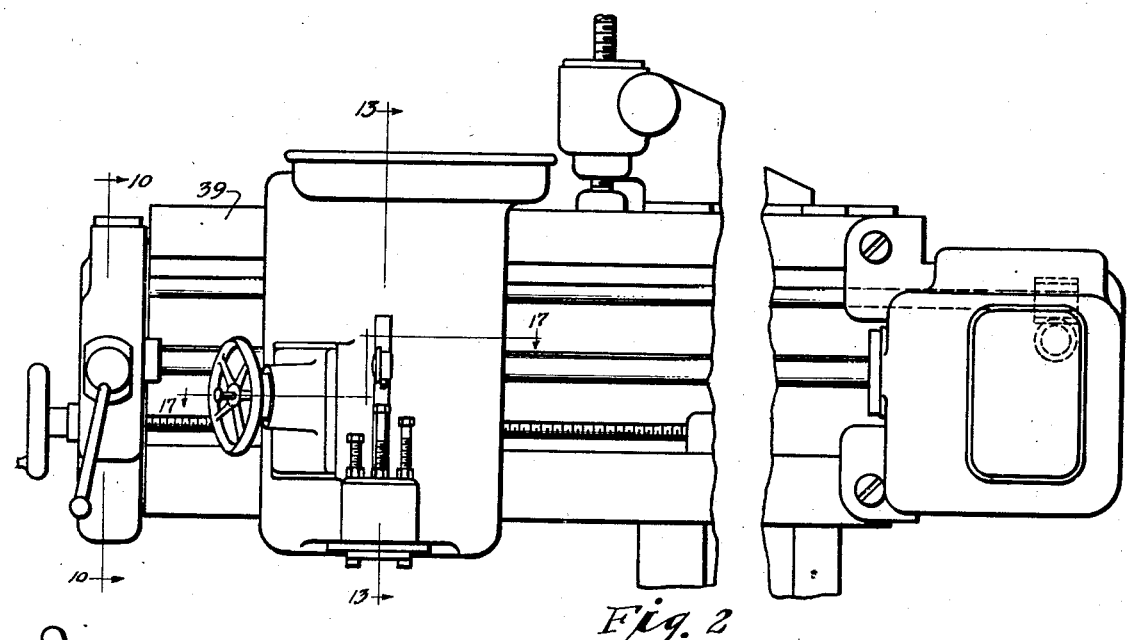
Figure 2 is a fragmentary elevational view of certain parts of the tool.

A machine embodying this invention may comprise a fixed bed 25 having formed longitudinally centrally thereof a guideway 26 receiving a similarly shaped guide or tongue 27 depending from the under surface of a work supporting table 28. The table 28 is adapted to be translated by any desirable means, for example, by hydraulic pressure acting on a piston contained within a cylinder 29 secured to and carried by the bed 25. The piston within the cylinder 29 is connected by means of a piston rod 30 with one end of the table 28 whereby movement of the piston within its cylinder through the piston rod actuates the table. A valve is operatively connected with a manually actuable handle 31 whereby to effect the control of the hydraulic fluid manually as well as automatically through a plunger 32 which is similarly connected to the valve above mentioned. The plunger 32 is adapted to be sequentially actuated by a series of dogs 33 adjustably mounted in T-slots 34 formed in the forward edge of the table 28.

Secured to the rear face of the bed 25 is a column 35 rising vertically above the bed 25. The column is provided with bearing surfaces 36, 37 and 38 for guiding a vertically shifted member or rail 39. The rail 39 is in turn provided with ways 40 and 41 for guiding the tool head 42 mounted thereon. The tool head 42 is adapted to be power and manually actuated longitudinally of the rail 39.

The head 42 is power actuated through a suitable transmission, receiving power from a prime mover 43 mounted on motor bracket 44 formed on the end of the rail 39 beyond the column 35. The rail 39 is further provided with or has secured thereto a reverse box 45 into which the shaft 46 of the motor 43 projects. The motor shaft 46 has secured to it a worm 47 meshing with a worm wheel 48 on one end of a drive shaft 49 which extends longitudinally of the rail 39. The box 45 has formed interiorly thereof a bearing sleeve 50 in which is journaled one end of the shaft 49. The other end of the shaft 49 is journaled in a bearing 51 formed within a housing 52 secured to the forward end of the rail 39. This end of the shaft 49 has secured thereto a gear 53 meshing with a gear 54 secured to one end of sliding gear shaft 55 which is mounted in suitable bearings in the walls of the housing 52. The shaft 55 has mounted on its splined end gear sleeve 56 comprising gears 57, 58 and 59, respectively adapted to mesh with gear 60, 61 and 62 of gear sleeve 63 loosely journaled on intermediate shaft 64 journaled in the walls of the housing 52. The gear sleeve 63 is further provided with a gear 65 adapted to mesh with gear 66 of compound gear 67 slidably keyed to a sleeve 68 loosely journaled on the shaft 69 rotatably mounted in the walls of the housing 52. The sleeve 68 is provided on its forward end with clutch teeth 70 adapted to mesh with complementary clutch teeth 71 formed on the adjacent face of a safety clutch 72 secured to the shaft 69 and through which the said shaft is adapted to be rotated. The clutch 72 is also provided around its outer periphery with gear teeth 72A adapted to mesh with a pinion 73 secured to or integral with the intermediate shaft 64. On the end of the shaft 64 is keyed or otherwise secured a gear 74 meshing with a pinion 75 integral with or secured to gear sleeve 68. The compound gear 67 is also provided with a second smaller gear 76 adapted to be meshed with the gear 61 of gear sleeve 63.

The final shaft 69 terminates in an enlarged head 77 forming a bearing 78 for one end of a short shaft 79 which has its other end journaled in the cover plate 80 of the housing 52. The shaft 79 has keyed thereto double gear 81 which comprises gears 82 and 83 and has loosely journaled thereon the gear 84. The shaft 79 is further formed with a splined portion 85 on which is slidable the double clutch 86 having clutch teeth 87 on one end thereof adapted to engage clutch teeth 88 on the adjacent end of the head or bearing portion 77 of shaft 69. The clutch 86 is formed on its other end with clutch teeth 89 adapted to be meshed with clutch teeth 90 formed on the adjacent end of gear 84. The clutch 86 forms a rapid traverse and feed clutch for connecting either the feed or rapid traverse mechanism with the head shifting means.

The foregoing gearing represents the feed transmission to the shaft 79 and gears 82 and 83 and these gears are respectively coupled with gears 91 and 92 loosely journaled on reverser shaft 93. The gear 82 is connected or meshed with the gear 91 through an idler gear 94 on the shaft 95, see Figure 7, while the gear 83 is directly coupled with the gear 92. The shaft 93 between the gears 91 and 92 is provided with a splined portion 96 for a reverser clutch 97 which is provided on opposite faces with clutch teeth 98 and 99. The clutch teeth 98 are adapted to engage similar teeth 100 formed on the adjacent face of the gear 92 while the clutch teeth 99 are adapted to mesh with clutch teeth 101 formed on the adjacent face of the gear 91. Keyed to the reverser shaft for rotative movement therewith is a pinion 102 meshing with a gear 103 keyed or otherwise secured to the end of a lead screw 104. The screw 104 is journaled in suitable anti-friction bearings supported by the housing 52 and projects beyond said housing having loosely slidably mounted thereon a hand wheel 105 having associated therewith a clutch 106. The clutch 106 is adapted to mesh with the clutch 107 and these clutches are normally separated by means of a spring 108 surrounding the screw 104.

The rapid traverse train to the shaft 79 includes the gear 53 on shaft 49, and gear 54, which meshes with an idler gear 109 journaled on a shaft 110 and meshing with the gear 84 fast on the shaft 79. The means for effecting the shifting of the several speed change gears and connecting clutches will be described in detail later.

The feed train above described extends from the shaft 49 through gears 53 and 54, shaft 55, either of gears 57, 58 or 59 when respectively meshed with either of gears 60, 61 or 62, gear sleeve 63, either of gears 65 or 61 when respectively meshed with gears 66 or 76, sleeve 68, pinion 75, back gear 74, pinion 73 to the safety clutch 72. The transmission then is connected through clutches 87 and 88 to the shaft 79 through the reverser gears 82 and 83 depending on the position of the clutch 97, for effecting the rotation of the screw. The feed chain instead of passing through the back gear 74 may be directly coupled through the clutch teeth 70 and 71 for rotating the clutch at a high series of speeds, which would then be connected to the screw in the same manner as the other series of speeds. The rapid traverse transmission is through the gears 53 and 54, idler gear 109, gear 84, clutch teeth 89 and 90 for rotating the gears 82 and 83 when the spindle head will be shifted either to the right or left at rapid traverse rates depending upon the position of the clutch 97.

The lead screw 104 has a threaded connection at 111, Figure 13, with the head 42 whereby rotation of the screw in either direction effects corresponding movement of the said spindle head.

The safety clutch 72 is provided with a circumferential groove 112, see Figure 11, receiving a shifter fork 113 secured to the end of a rod 114 slidably mounted in bearings provided by the housing 52. The end of the rod 114 terminates in a knob 115 whereby the rod is actuated. A spring loaded detent 116 co-operates with suitable notches formed in the rod 114 for yieldably holding the rod in its two operative positions. From this it will be noted the clutch may be shifted to two positions for engaging the clutch teeth 70 and 71 or intermeshing the gears 73 and 72A.

The sliding compound gear 67 is adapted to have its larger gear 66 flanked by a shifter fork 117, see Figure 12, secured to shifter rod 118 slidably mounted in bearings provided by the housing 52 and held in its operative position by means of a spring loaded detent 119 co-operating with suitable notches formed in the rod 118. This rod 118 also terminates in a knob 120 whereby it is shifted and it will be noted that through the rod 118 gears 61 and 76 may be intermeshed or the gears 66 and 65 operatively connected.

The gear cone 56 is provided with a circumferential groove 210, see Figure 21, receiving a shifter fork 211 secured to the shifter rod 212 journaled in suitable bearings provided by the housing 52. The rod 212 is provided in its forward end with a socket 213 receiving the pin 214 extending from an arm carried by an oscillatable shaft 215. The shaft 215 extends through the wall of the housing and is provided on its exterior end with a lever 216 whereby oscillation of the shaft effects axial shifting of the rod 212. The rod is further provided with suitable detent notches co-operating with a spring loaded detent 217 whereby the said gear cone is retained in its several operative positions against inadvertent shifting movement.

The rapid traverse and feed clutch is provided with a circumferential groove receiving a shifter fork 122, see Figure 10, pivotally mounted for movement in a horizontal plane through an actuator 123. The actuator 123 is secured to a sliding shaft 124 for movement to the right and left, as seen in Figure 10. Secured to the shaft 124 intermediate its ends is a dog 125 received in a notch 126 formed in shift rod 127. The shift rod 127 is axially and rotatably mounted in a sleeve 128. The sleeve 128 forms at one end thereof a head 129 to which is pivotally secured as at 130 the actuating handle 131. The handle 131 is in turn secured at 132 to the shift rod 127. A cap 133 is secured to the housing cover 80 and encloses the head 129 of the sleeve and the cap is provided with an H-shaped opening 134 formed therein through which the handle 131 projects. The oscillation of the handle 131 about the pivot 130 effects an in and out movement of the rod 127 for connecting the clutch 86 with either the feed train or the rapid traverse train by swinging the clutch shifter fork to the right or left, as seen in Figure 5. To insure the proper coupling of the clutches, the dog 125 is provided on its upper end with notches co-operating with a spring loaded load and fire arm 135.

The actuator 123 has projecting from it a stud 136 connected to one arm of a pivotally mounted bell crank 137, which has connected to its other arm a link 138. The lower end of the link 138 is connected to one arm of a pivotally mounted bell crank 139 which has a ball and socket connection 140 with a short rack shaft 141. The shaft 141 meshes with a rack pinion 142 formed on the end of a dog rod or rail 143. Rail 143 projects beyond the housing 52 for automatically disconnecting the mechanism through means later to be described.

The sleeve 128 in which the rod 127 is journaled has keyed to its rear end a collar 144 connected with a shifter fork 145 that is received in the circumferential groove 146 formed in the reverser clutch. Connected with the shifter fork as at 147 is an oscillatory rod 148 having an operative connection at 149 with a gear segment 150 meshing with the rack formed on the upper surface of the dog rod or rail, whereby operation of the reverser clutch effects shifting movement of the dog rail. The sleeve 128 for operating this reverser clutch is adapted to be shifted in the direction in which it is desired to actuate the tool head. To insure the proper shifting of the clutch, the collar 144 is provided on one face thereof with detent notches co-operating with load and fire dog 151, see Figure 16.

From the foregoing description, it will be noted that the handle 131 is oscillated in a vertical plane toward and from the housing 52 for connecting the feed or rapid traverse clutch whereupon the lever 131 is oscillated in a direction indicative of the direction it is desired to move the tool head, at the speed or rate determined by the connection of the rapid traverse or feed clutches. It will also be noted that the feeding speed will be determined by the connection of the several sliding gears above described. It will further be noted that there has been provided a mechanism carried by a shiftable rail for operating the milling head in the several directions at both rapid traverse and feeding speeds and that the prime mover is also carried by the said vertically shiftable rail.

The head 42 has journaled therein a tool spindle 152 to which is secured a gear 153 meshing with a pinion 154 on a vertically disposed shaft 155. This shaft 155 carries near its lower end a gear 156 meshing with pinion 157 on bevel gear shaft 158 having secured thereto or integrally formed therewith the bevel gear 159. The bevel gear 159 is adapted to mesh with complementary bevel gear 160 slidably splined on the tool or spindle drive shaft 161. This shaft 161 extends the length of the rail 39 being journaled at one end in suitable bearings 162 provided by the housing or box 45 and at the other end in a bearing 163 secured to the speed change gear box 52. The shaft 161 is provided on its end interiorly of the housing 45 with a bevel gear 164 meshing with complementary bevel gears 165 and 166 loosely journaled on a shaft 167 supported by the housing 45. The shaft 167 has secured to its one end a gear 168 meshing with a pinion 169 on an intermediate or idler gear shaft 170 mounted in the housing 45. Secured to the shaft 170 is a gear 171 in turn meshing with a pinion 172 on the motor shaft 46 whereby the shaft 167 is rotated from the same motor as the feed shaft 49. The gears 165 and 166 are provided on their adjacent faces with clutch teeth 173 and 174 adapted to respectively mesh with similar clutch teeth 175 and 176 formed on sliding clutch 177 splined on the shaft 167 intermediate the gears 165 and 166. The clutch 177 is formed with a circumferential groove 178 receiving the shifter fork 179 secured to the end of rod 180 which is journaled in bearings provided by the housing 45. Secured to the rod 180 exteriorly of the housing 45 is a lever 181 whereby the clutch is shifted for connecting either of the gears 165 and 166 with the shaft 167 and thereby rotating the spindle drive in reverse directions.

The spindle 152 is adapted to be vertically actuated toward and from the work through a sleeve or quill 182 which surrounds the spindle and is journaled in a bearing provided by the head 42. The quill 182 is provided with rack teeth adapted to mesh with a pinion 183 secured to a shaft 184 and on which shaft there is also keyed or otherwise secured a worm wheel 185 meshing with a worm 186. The worm 186 is carried by a hollow sleeve-like shaft 187 having formed at the end thereof clutch teeth 188. The sleeve 187 is also provided with gear teeth 189 adapted to mesh with back gear 190 on a shaft 191. This shaft 191 carries a pinion 192 meshing with gear 193 and having secured thereto a clutch 194. A sliding clutch 195 having clutch teeth on opposite ends thereof is provided for connection with either the sleeve clutch 188 or the gear clutch 194. This sliding clutch 195 is connected with a slide rod 196 which projects through the hub of a hand wheel 197 journaled in the head 42. From this it will be seen that the spindle through the quill 182 may be shifted at slow or rapid feeding rates through the hand wheel 197 depending on whether the clutch 188 or 194 is in operative connection with the hand wheel 197.

To counterbalance and assist in the shifting of the spindle and quill, the shaft 184 has secured to it a pinion 198 meshing with a gear 199 secured to a shaft 200 journaled in the spindle head 42. The shaft 200 also carries a rack pinion 201 meshing with vertically shiftable rack bar 202. The bar 202 extends into an enlarged chamber whereby a shoulder 204 is provided below one end of the rod 202. Enclosed within the chamber and surrounding the rod 202 is a spring 205 abutting on one end with the shoulder 204 and on the other end with a collar 206 secured to the end of the rod 202. From the foregoing, it will be noted that the rod 202 moves with and in the direction of the spindle 152 and yieldingly restrains rapid descent of the spindle other than at the rate at which the hand wheel is actuated. While if the spindle is being lifted, the spring 205 tends to expand and assist in raising the spindle and parts moved thereby.

The head 42 has projecting from its rear end a trip dog 207 adapted in operation to lie between adjustable dogs 208 and 209 adjustably secured to the dog rail or shaft 143. Through these parts, the movement of the head in either direction is automatically controlled or stopped. This is effected through the shifting of the rack 142, gear segment 150, operative connection 149 and oscillatable rod 148 for shifting the clutch shifter 145 to the neutral position and thereby stopping further travel of the head.

The rail 39 is adapted to be vertically shifted for which purpose it has secured to it and projecting upwardly therefrom a screw 218 having a threaded connection with a nut 219 rotatably journaled in a bracket or housing 220 secured in any desirable manner to the upper end of the column 35. Secured to or formed integrally with the nut 219 is a worm wheel 221 adapted to mesh with a worm 222 on a transverse shaft 223 journaled in the bracket 220. Shaft 223 extends beyond the bracket 220 and has loosely journaled on its extending portion a lever or handle 224 provided with clutch teeth 225. Secured to the shaft 223 near the clutch 225 is a second clutch 226 adapted to co-operate with the clutch 225 for rotating the shaft through the handle 224. A spring 227 is provided between the clutches for normally maintaining them in an inoperative position but permitting easy coupling of the clutches when desired to operate the screw and effect the vertical movement of the rail.

The quill 182 of the spindle 152 has secured to its lower end a bar 228 which is of a dovetailed cross section, as particularly illustrated in Figure 17. This bar 228 is received in and guided by a correspondingly shaped guideway 229 formed in the outer surface of the head 42. Near the upper end of the bar 228 is secured a bracket 230 supporting a dial indicating gauge 231 from which a plunger 232 projects. Movement of the quill in a vertical direction carries with it the bar 228 and gauge 231. Secured to the housing or head 42 and spanning the guideway 229 therein is a bracket 233 containing a revolvable head or turret 234 having adjustably secured therein a series of stops 235 adapted to be respectively aligned with the plunger 232 of the indicator for engagement with the plunger 232 thereof. A spring loaded detent 236 is carried by the bracket 233 for yieldingly retaining the head or turret 234 in its several adjusted positions. This mechanism is employed for indicating and determining the depth to which the spindle and tool carried thereby have been fed so that the operator may be apprised of the exact position of the tool when it nears the limit of the desired cut.

Figure 4:
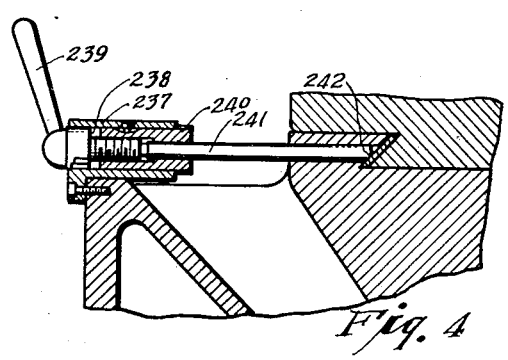
Figure 4 is a fragmentary sectional view taken on line 4—4 of Figure 1.

During the vertical shifting of the spindle and tool, the table 28 may be locked in position, for which purpose the bed 25 has secured thereto a sleeve 237, see Figure 4, in which is rotatably journaled a screw 238 operated by a lever or handle 239 secured thereto. The sleeve 237 has secured therein a second sleeve 240 forming a bearing for one end of a slide rod 241 which abuts the inner end of the screw 238. The other end of the rod 240 is journaled in the bed ways and has a tapered nose 242 adapted to engage one side of the table guide 27. From this it will be seen that rotation of the handle 239 in a given direction axially shifts the rod 241 into engagement with the table ways for clamping it in position against any longitudinal movement.

What is claimed is:

1. In a milling machine the combination of a bed, a column rising from one side of the bed and having guideways formed thereon lying in a plane which intersects the bed substantially midway of the length thereof, a rail interengaged with the column guideways for movement longitudinally thereof and substantially in said plane, a work table mounted on the bed for movement transversely of the rail, means midway of the length of the bed on the side opposite to the column for controlling the table, a tool head guided on the rail for movement transversely of the work table, a lead screw journaled in the rail in operative engagement with the head, a prime mover mounted on the end of the rail adjacent the column, a gear box mounted on the opposite end of the rail for access thereto from the table control side of the bed, a power shaft extending from the prime mover to the gear box, means in the gear box for connecting the power shaft with the screw to cause relative transverse movement between the tool head and table to effect a milling operation on work carried thereby, and means in the gear box for varying the rate of rotation of the screw and thereby the feed rate of the tool head.

2. In a milling machine the combination of a bed, a table reciprocably mounted on the bed, a column extending upwardly at one side of the work table, vertical guideways formed thereon, a rail inter-engaged with the said guideways for vertical adjustment toward and from said table, a tool head mounted on the rail, a lead screw journaled in the rail in operative engagement with the head, a prime mover mounted on the end of the rail adjacent the column, a gear box mounted on the opposite end of the rail in adjacent relation to the side of the table opposite to the column, a power shaft coupling the prime mover to the gear box, means on the side of the bed opposite to the column for controlling the movement of the table, and additional means on the end of the rail and above said table control means for determining the feed rate of the tool head whereby the machine may be controlled from a single operating station.

3. In a milling machine the combination of a bed, a table reciprocably mounted on the bed, a column rising from the bed at one side of the work table, vertical guideways formed thereon, a rail inter-engaged with the column guideways and projecting transversely over said table, a tool head mounted on the rail, a lead screw journaled in the rail in operative engagement with the tool head, a prime mover mounted on the end of the rail adjacent the column, a gear box mounted on the opposite end of the rail in adjacent relation to the side of the table opposite to the column, a power shaft coupling the prime mover to the gear box, means on the side of the bed beneath the end of the rail for controlling the movement of the table, additional means on the end of the rail above said table control means for determining the feed rate of the tool head whereby milling operations in two different directions may be controlled from a single operating station, a tool spindle journaled in the carrier, a horizontal spline shaft extending longitudinally of the rail for effecting rotation of the spindle, a housing mounted adjacent the prime mover for receiving one end of the spline shaft, and a reverser mechanism mounted in the housing for coupling the prime mover to the spline shaft.

4. In a milling machine of the class described, the combination with a bed having a table reciprocably mounted thereon, of means on the bed at one side of the table for controlling the rate and direction of movement thereof, a column having guideways formed thereon projecting upward from one side of the bed, a rail inter-engaged with the column guideways for vertical movement, said rail projecting laterally from the column over the work table, a tool head mounted on the rail for movement transversely of the direction of movement of the table, a prime mover supported at one end of the rail, a gear box mounted on the opposite end of the rail, a drive shaft connecting the prime mover with the gear box, said box having a feed transmission and a rapid traverse transmission therein constantly driven by the prime mover, a lead screw extending longitudinally of the rail in operative engagement with the tool head, means on the gear box above said table control for selectively coupling either transmission to the lead screw to effect feeding movements or rapid traverse movements to the tool head whereby milling operations in two different transverse directions may be controlled from a single operating station.

5. In a milling machine of the class described the combination of a bed, a work table reciprocably mounted on the bed, means on the bed adjacent one side of the table for controlling the rate and direction of movement thereof, a column extending upward from the bed at the opposite side of the table, said column having vertical guideways formed thereon, a cross rail supported on said guideways in overhanging relation to the table, a spindle carrier mounted on said rail, a cutter spindle journaled therein, means for power feeding the carrier transversely of the work support, including a prime mover mounted on one end of the rail adjacent the column, a transmission housing mounted on the end of the rail in adjacent relation to said table control means, individual power trains extending from the prime mover to the transmission housing and to the cutter spindle, a lead screw extending longitudinally of the rail in operative engagement with the spindle carrier, a feed transmission and a rapid traverse transmission mounted in said housing and constantly driven by the prime mover, a reverser mechanism in series with said transmissions, and a single control lever mounted on said housing having movement in a plane parallel to the plane of movement of the carrier, control mechanism coupling the lever to said transmissions and reverser mechanism whereby movement of the lever in said plane will determine the direction of movement of the spindle carrier, and additional movement of the lever transversely of said plane will determine the rate of movement thereof.

6. In a milling machine of the class described the combination of a bed, a work table reciprocably mounted thereon, control means carried by the bed adjacent one side of the table for determining the rate and direction of table movement, a column extending upwardly from the bed at the side opposite to the table control means, said column having vertical guideways formed thereon, a cross rail mounted on said guideways and projecting over the table in a plane transverse to the direction of table movement, a spindle carrier mounted on the rail, a cutter spindle journaled in the carrier, means for effecting power movement of the tool head transversely of the work support including a prime mover mounted on one end of the rail adjacent the column, a transmission housing mounted on the opposite end of the rail in adjacent relation to said table control means, branch transmissions actuated by the prime mover and extending respectively to the transmission housing and to the cutter spindle, a lead screw extending longitudinally of the rail in operative engagement with the tool head, a feed transmission and a rapid traverse transmission mounted in said housing for constant actuation by one of said branch transmissions, a shiftable rate determinator for selectively coupling the feed transmission or rapid traverse transmission to the lead screw, a reverser mechanism in series with said rate determinator, said reverser mechanism including a shiftable clutch member, and a single rate and direction control lever mounted on said housing and operatively connected to said shiftable members, said lever being movable in a direction indicative of the desired direction of movement of the spindle carrier to shift said clutch member, and in a transverse direction for actuating said rate determinator.

7. In a milling machine having a work table and a cutter spindle, means for supporting said parts for relative movement in two directions whereby surfaces extending in angular directions but lying in one plane may be machined in one set up of the work piece including a bed for supporting the table for movement in one direction relative to the cutter, and a rail for supporting the spindle for movement in a second direction transverse to the direction of movement of the table, a column extending upwardly from the bed for supporting said rail, manually operable means for effecting adjustment of the rail relative to the table, power actuated means mounted in the bed for effecting reciprocation of the table, dog controlled means associated with the table for determining the rate and direction of movement thereof, power actuated means carried by the rail for effecting reciprocation of the carrier transversely of the table, rate and direction determining means for said carrier, and dog controlled trip means carried by the rail for cooperation with the carrier for controlling the movement thereof.

8. In a milling machine having a table and a cutter spindle, means for effecting relative movement between the table and spindle in two directions transverse to one another, comprising a bed for supporting the table, rate and direction control means carried by the bed for controlling the table movement, a horizontal rail extending transversely over the table, a spindle carrier mounted on the rail having a spindle journaled therein, a column for supporting the rail, means for effecting adjustment of the rail toward and from the table, power actuated means for effecting translation of the spindle carrier along said rail including a prime mover mounted on one end of the rail, rate and direction control means mounted on the other end of the rail, a power shaft extending from the prime mover to said control means for constant actuation thereof, an oscillatable and reciprocable member for operating said control means, a manually operable lever movable in two planes for determining the rate and direction of movement of the carrier, said oscillatable member extending parallel to the direction of carrier movement, and trip means mounted on the carrier cooperating with dogs mounted on said member for automatically stopping the movement thereof.

9. In a milling machine having a horizontal work table and a vertical cutter spindle, the combination of means for relatively positioning the spindle with respect to the table for determining the depth of cut, and for effecting relative movement between the cutter and work in two angularly related paths lying in the same or parallel planes comprising a bed for supporting the table, power transmission means mounted in the bed for effecting reciprocation of the table, rate and direction control means carried by the bed for determining the movement along one path, a horizontal rail above the table extending transversely thereof, a spindle carrier reciprocably mounted on the rail for supporting said spindle, a column adjacent one side of the table for supporting the rail, means carried by the column for effecting relative adjustment between the rail and bed for approximating the depth of cut, a quill for supporting the spindle in the carrier, adjustable fixed stops mounted on the carrier, means operatively connected with the quill and cooperating with said stops for determining the final position of the cutter with respect to the work support, said means including an indicator dial movable with the quill, power operated means carried by the rail for effecting translation of the cutter spindle transversely of the table to effect a machining operation in a direction transverse to the direction of movement of the table, and means mounted on the end of the rail for controlling the spindle carrier movement whereby both machining operations may be controlled from a single operating station.

10. In a milling machine having a bed, a table reciprocably mounted on the bed, a rail extending transversely of the table and midway of the length of the bed, means for supporting one end of the rail, a tool carrier movable on the rail having a cutter spindle journaled therein, means for translating the carrier and rotating the spindle including a prime mover mounted on one end of the rail, a first train driven by the prime mover and extending to the opposite end of the rail, branch transmissions driven by the first train and terminating respectively in a feed actuator and a rapid traverse actuator, a final train selectively connectable to said actuators and extending to the carrier for translation thereof at different rates an additional train driven by the prime mover, and means for reversely connecting the last mentioned train with the spindle for rotation in opposite directions thereby.

11. A milling machine having a bed, a work table supported thereby, a rail extending over the table and transversely thereof, a column for supporting the rail above the table, a tool carrier movable on the rail having a cutter spindle journaled therein, means for translating the carrier and rotating the spindle including a power shaft journaled in the rail adjacent the column, a first train coupled with the shaft for actuation of the spindle, a reverser for selectively coupling said train with the shaft for opposite rotation of the spindle, a second train driven by said shaft exclusive of said reverser, a feed transmission and a rapid traverse transmission connected for continuous actuation by the second train, a final train for translating said carrier, manually operable means serially arranged for coupling either transmission to the final train for determining the rate and direction thereof including a single control lever which is directional in effect when determining the direction of movement of the carrier.

MILLARD ROMAINE.
WALTER D. ARCHEA.